Sept. 15, 1959 W. H. HERAEUS ET AL 2,904,713
CASINGS FOR GAS DISCHARGE TUBES AND LAMPS AND PROCESS
Filed Nov. 25, 1953 3 Sheets-Sheet 3

INVENTORS
WILHELM H. HERAEUS
AND
HEINRICH MOHN

United States Patent Office 2,904,713
Patented Sept. 15, 1959

2,904,713

CASINGS FOR GAS DISCHARGE TUBES AND LAMPS AND PROCESS

Wilhelm Heinrich Heraeus, Newark, N.J., and Heinrich Mohn, Hailer, Kreis Gelnhausen, Germany, assignors to Heraeus Quarzschmelze G.m.b.H., Hanau am Main, Germany Application November 25, 1953, Serial No. 394,462

Claims priority, application Germany July 15, 1952

6 Claims. (Cl. 313—112)

This invention relates to quartz lamps used both for therapeutic and visible lighting or illumination purposes. This application is a continuation-in-part of our corresponding application Serial No. 367,687, filed July 13, 1953.

One object of this invention is to produce quartz lamps of high emission of energy or light, both ultra-violet and illuminating, and maintaining such emissions for a long time at high efficiency.

Another object of this invention is to provide quartz glass casings for gas discharge tubes, said casings being made from substantially pure quartz glass and imparting to gas discharge tubes and lamps a prolonged service life and other valuable properties.

A further object of this invention is to provide a process of making such casings from quartz glass.

Still another object of this invention is to provide a process of producing substantially pure quartz glass which is suitable not only for making casings of gas discharge tubes and lamps but also for making other quartz glass articles and quartz glass parts of articles and apparatus useful, for instance, for optical instruments and the like.

A further object of this invention is to provide a process of providing casings of quartz glass for gas discharge tubes which casings are made from quartz glass subjected to a process whereby foreign elements having a harmful effect upon the service life of such gas discharge tubes are rendered harmless.

Other objects of this invention and advantages features thereof will become apparent as the description proceeds.

Quartz lamps have been widely used for therapeutic purposes and lately have come into extensive use in street lighting systems. Such quartz lamps, in all manner of use, lose a substantial part of their efficiency by reason of the substantial deterioration of the quartz glass casing or envelope.

Ultra-violet therapeutic lamps, made of quartz glass, rated at 100% efficiency when first used, lose substantially 40% of their ultra-violet ray emission efficiency after about 1500 hours of use although the lamp as an ultra-violet ray producing instrument still has many hundreds of additional hours of useful operation. The same substantial loss of visible light emission occurs with quartz lamps used for illumination purposes although there again the lamp as a light producing instrument has many hundreds of additional hours of useful operation. Such loss of efficiency commences almost initially with the operation of the lamps and is evident from examination after 100 hours of use and after about 1500 hours of use such efficiency has dropped about 40% from its initial efficiency.

Such loss in street illumination is highly uneconomical as such lamps generally have a service span of well over 3000 hours. In ultra-violet therapeutic lamp uses, the deterioration is not only costly but leaves the user without exact information how long the lamp is to be used as a therapeutical appliance.

It has been found that high resistance to aging and a considerably prolonged service life are achieved when using a substantially pure quartz glass. The degree of purity of the quartz glass used for making casings for quartz lamps and the like is of the utmost importance with respect to a prolonged service life of such lamps. Casings of gas discharge tubes as they are used in high pressure lamps as well as in low pressure lamps have a remarkably longer service life when made from substantially pure quartz glass than when made as heretofore from quartz glass selected solely for its ability to transmit the rays involved.

It is, therefore, an essential object of this invention to provide quartz glass casings for gas discharge tubes, said casings being made from quartz glass of a high degree of purity.

Thereby not only coarse particles of impurities that are visible to the naked eye or under a low-power microscope must substantially be absent but also impurities which are of very small particle size or are present in the quartz glass in molecular magnitude and therefore not visible.

According to the present invention quartz glass is used which is substantially free not only of conductive elements, such as metals, for instance, copper, iron, alkali metals, or alkaline earth metals, or carbon, but which is also substantially free of metalloids such as arsenic and tellurium and of compounds of such elements that exert an unfavorable influence upon the service life of quartz lamp casings made therefrom. Although best results are achieved when using chemically pure quartz glass, in practical operation it is not always possible to produce such chemically pure quartz glass. The amount of impurities present therein, however, must be the lowest possible amount achieved in ordinary manufacture, i.e., the quartz glass must be substantially pure.

It is one of the characteristic features of the present invention to use, in the manufacture of quartz glass casings for gas discharge tubes and the like, a quartz glass the degree of contamination of which is so small that formation of seed-like formations or nuclei which will cause subsequent crystallization within the quartz glass is substantially eliminated and, due thereto, the devitrification temperature is considerably increased or, respectively, devitrification of casings made from such substantially pure quartz glass due to exposure to high service temperature is considerably retarded. Surprisingly it was found that, with such a substantially pure quartz glass, the tendency of gas discharge tubes to become discolored in operation is also considerably reduced.

In order to produce quartz glass or quartz glass casings of the required purity, it is necessary to proceed in such a manner that any substantial introduction of impurities into the quartz glass during the manufacture of said casings is excluded. To achieve said purpose, it is advisable to use the purest possible starting material, for instance, pieces of pure rock crystal. Said starting material is then purified as far as possible and the melting process and preferably the building up and drawing processes are carried out in such a manner that not only any substantial introduction of impurities into the quartz glass is excluded, but also under conditions, for instance, in an atmosphere whereby foreign elements that may be present in the quartz glass are rendered harmless or eliminated and carried away.

Processes of manufacture are preferred which take place at comparatively high temperatures, for instance, between 2000° C. and 2400° C. At such temperatures impurities are separated or evaporated. Care must be taken, of course, that such high temperatures exert their purifying effect uniformly over the entire cross section of the molten quartz.

An especially advantageous process consists in melting and building up such substantially pure quartz glass in a gas atmosphere, for instance, in the atmosphere of a noble gas, such as argon or helium, or in the atmosphere of a gas like oxygen or chlorine or other halogens. The presence of such gases not only impedes introduction of foreign elements but gases, such as oxygen or halogens, especially chlorine, react with the contaminating elements and cause evaporation thereof in the form of volatile compounds.

Thereby conditions and especially temperatures are chosen whereby the reactivity of said gases with the atoms composing the quartz glass to be purified is insignificant.

Occluded gases as well as any compounds formed therewith are readily driven off and expelled by heating to a suitable temperature, if necessary, in a vacuum.

By this means it is possible to reduce the amount of impurities, even when present in molecular or atomar size, to a minimum or to substantially eliminate the same.

Should, in spite of proper precautions, larger particles of impurities from the furnace walls or drawing tools, for instance, impurities of a size visible to the naked eye, penetrate into the quartz glass, it is possible to subsequently remove said coarse particles of impurities, for instance, by locally heating the corresponding part of the shaped quartz casing. Another way to render said coarse particles harmless consists in uniformly distributing the same throughout the quartz glass by diffusion or even, although not as advantageously, by mechanical homogenization. Such a procedure is also capable of reducing the formation of vitrification seeds or nuclei which cause premature aging of the quartz lamp. Such homogenization process will be described in greater detail hereinafter.

Since treatment with halogens and especially with chlorine is of particular advantage and causes a noteworthy advance in the art, this feature of the present invention will be described more in detail in the following example.

The service life of casings for gas discharge tubes is considerably increased by processing, building up, and drawing quartz glass in the presence of chlorine. Said chlorine must be present in adequate concentration at those places where building up and/or drawing of the casings takes place. Consequently, it is necessary that chlorine is present directly at that place where the quartz glass is built up, molten, and/or drawn at high temperatures. The chlorine concentration must be sufficiently high to convert the disturbing impurities into more readily volatile compounds. The amount of chlorine required and its concentration can readily be determined by preliminary experiments and depends, of course, upon the purity of the starting material used. Although the presence of small amounts of hydrogen or hydrogen chloride in the chlorine atmosphere is generally of advantage, it is essential, when proceeding according to the present invention, that in case hydrogen is also present, chlorine must be present in considerable excess thereto.

In place of or together with elementary chlorine there can also be used a volatile decomposable chlorine compound provided the conditions are such that, on decomposition of said compound, the required chlorine concentration is assured. Of course, in place of chlorine compounds and chlorine, other halogen compounds and halogen can also be employed.

This especially advantageous process shall be described more in detail in the following example dealing with the production of quartz glass from silicic acid and especially from granulated rock crystals.

In principle, this process of chlorine treatment consists in continuously passing finely comminuted rock crystal material or the like through a fusion zone, continuously directing a stream of chlorine in the path of such continuously flowing rock crystal material to envelop said rock crystal particles in such chlorine gas, collecting the molten particles in a mass of substantially pure quartz glass, continuously building up such quartz glass mass from such molten particles, and removing and/or further working up the resulting substantially pure quartz glass to the desired articles, especially to casings for gas discharge tubes.

To carry out this invention, the known process is used whereby quartz powder is strewn upon the surface of a quartz glass nucleus, which serves as a bait and upon which a quartz glass body is built up. Thereby the quartz glass powder is fused to said nucleus or bait by heating the bait and the powder. Such heating may be effected, as has been suggested heretofore, by means of an electric arc or by means of the flame of a blower device. Heating in an electric resistance furnace or a high frequency furnace is also possible. According to the present invention heating, fusing, and building up of quartz glass is effected in the presence of elementary chlorine and/or volatile chlorine compounds which split off chlorine at the high processing temperature. Such a chlorine compound is, for instance, hydrogen chloride. In a preferred embodiment of this invention an oxygen-hydrogen flame is used for fusing the quartz. Thereby care must be taken that the hydrogen concentration of said flame is not too high. Preferably an oxygen concentration higher than the hydrogen concentration is chosen or the chlorine concentration is increased accordingly.

When processing and fusing the quartz glass body by means of a gas flame in the presence of chlorine, it is necessary to supply chlorine or gases splitting off chlorine in such a manner that their molecules are not blown or forced away by said heating flame from the place where the quartz glass is molten and processed. It is not sufficient to melt and process the quartz glass in a chamber exposed to a certain chlorine gas pressure. On the contrary, it is necessary to supply chlorine gas or gas splitting off chlorine to the processed surface in such a manner that the chlorine molecules surround and envelop the quartz particles shortly before and during their melting and during building up of the quartz glass body. Therefore the speed with which chlorine or gases yielding chlorine are supplied must at least be equal to the speed of the heating flame. The gases can also be supplied to the quartz particles and the molten surface of the quartz body through an accelerating nozzle under the required pressure. At each place of the surface there must be present such a minimum concentration of chlorine that those hydrogen atoms which do not react with oxygen or are not exposed to the oxidizing action of oxygen will contact at least an equimolecular amount of chlorine. Preferably a considerable excess of chlorine must be present at such places in view of the equilibrium determined by the law of mass action.

When melting and drawing quartz glass by heating with gases in order to produce casings of gas discharge tubes, it is, above all, necessary to eliminate, by reaction with chlorine, any free hydrogen that has not combined with the oxygen supplied to the reaction chamber or with any atmospheric oxygen present therein. In order to make certain that hydrogen will have no reducing effect upon the molten material or that it will not become occluded in said molten material, it is advisable to supply an amount of chlorine gas exceeding 1 mol percent and, in general, 5 mol percent calculated for one mol of heating gas mixture. Preferably, an amount of chlorine gas is used which is between 15 mol percent and 25 mol percent, although up to 30 mol percent may be employed.

The presence of other foreign gases, of course, is a burden or dead load on the process and impairs its thermal economy. It is, however, not necessary to exclude foreign indifferent gases, for instance, nitrogen or noble gases. Their presence, under certain circumstances, has the advantage that embedding of other impurities in the quartz glass is rendered difficult or even completely prevented.

It is not possible to give an upper limit with regard to the chlorine concentration. As stated above, at least so much chlorine must be present that all the impurities are eliminated. The thermal economy of the process determines the upper chlorine concentration. Too much chlorine, especially if it has not been preheated, will require large amounts of heating gas. However, if necessary, an amount of chlorine up to 100 mol percent calculated for one mol of the heating gas mixture may be used. The temperature at the place of processing must be at least 1600° C. and should preferably be above 1800° C. Best results are achieved when working between about 2000° C. and about 2200° C.

In general, it is sufficient if the chlorine gas or the gas yielding chlorine by decomposition is introduced and supplied with approximately the same speed and kinetic energy as the heating gases. It may even have a somewhat greater speed and kinetic energy than said heating gases so as to supply amounts sufficient for a reaction with the impurities present in the silicic acid particles to be molten and built up on the bait.

The attached drawings illustrate preferred embodiments of apparatus for carrying out the process according to the present invention and of ultra-violet and illuminating lamps provided with casings made according to the present invention. In these drawings.

Figure 1:
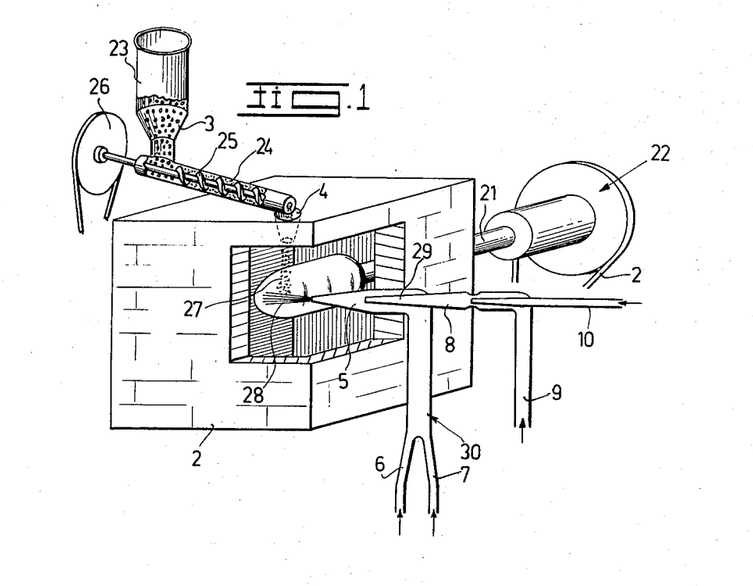
Fig. 1 is a perspective of a furnace for making a substantially pure cylinder-like quartz glass body wherein parts of the feeding device and the furnace, as well as the pipes for supplying heating gases and chlorine to the furnace, are shown in cross-section.

In Fig. 1 cylinder-like quartz glass body 1 is rotated around its longitudinal axis in furnace 2, which is constructed of highly refractory material, for instance, alumina, silimanite, quartz bricks, or the like material. Said quartz glass body 1 is built up on rotating quartz glass shaft 21 which is connected with and driven by power drive 22. Said shaft 21 is the bait for building up the substantially pure quartz glass body 1. It is arranged in furnace 2 in such a manner that it can be slowly and gradually withdrawn therefrom in accordance with progressive building up of quartz glass body 1. Grains of rock crystal 3 are placed in hopper 23 and are conveyed through feeding pipe 24 by means of screw conveyor 25, which is driven by power drive 26 to funnel-like feeding opening 4 in said furnace. Said grains of rock crystals are thus continuously and uniformly strewn upon surface 27 of said quartz glass cylinder 1. Said surface 27 is heated by flame 28 produced by blower 29 arranged laterally to said quartz glass cylinder 1. In place of feeding tube 24 provided with conveyor screw 25 other feeding means may, of course, also be used. The illustrated feeding tube 24 with conveyor screw 25, however, allows exact dosage and continuous and uniform supply of rock crystal grains 3 to furnace 2. Said grains of rock crystal 3 pass from hopper 23 into the one end of feeding tube 24. Rotation of conveyor screw 25 by means of power drive 26 conducts said finely granulated rock crystals 3 to funnel-like down pipe 4. As stated above, this arrangement of feeding device and down pipe 4 permits continuous and uniform supply of the rock crystal grains to cylinder surface 27 which is molten by flame 28 of blower device 29. In this manner rock crystal grains 3 are supplied to a limited narrow space of quartz glass cylinder 1. Heating to melting of building up surface 27 of said quartz glass cylinder 1 is achieved, as stated above, by blower 29. Said blower 29 has a burner nozzle 5 through which a mixture of hydrogen and oxygen passes. Said mixture, at the beginning of the process, is ignited and provides flame 28 for melting rock crystal grains 3 supplied to furnace 2 as well as to surface 27 of quartz glass cylinder 1. Hydrogen is supplied to said burner nozzle 5 through pipe 6 and oxygen through pipe 7. Both gases are mixed with each other in mixing pipe 30, which is connected with burner nozzle 5. Such amounts of hydrogen and oxygen are supplied that the required melting and reaction temperature is produced at surface 27 of quartz glass cylinder 1. Mixing tube 8 extends into burner nozzle 5. Said mixing tube 8 is connected with tube 9 through which chlorine is supplied. Another nozzle 10 extends into said mixing tube 8. Oxygen is introduced through said nozzle 10 into mixing tube 8 and is mixed therein with chlorine. Oxygen is introduced into mixing tube 8 through nozzle 10 under a pressure of 0.5–1.0 atmosphere gauge. Thereby such a high speed of flow is produced that the chlorine laterally supplied through pipe 9 is accelerated to the same speed as that of flame 28. The result of this arrangement is that chlorine is mixed with the heating gases before said heating gases escape through burner nozzle 5. Said burner nozzle 5 preferably consists of a material highly resistant to corrosive chemicals and to heat such as, for instance, quartz glass or sintered corundum Preferably, said burner nozzle 5 is provided with a jacket so that it can be cooled, for instance, by means of water.

Figure 2:
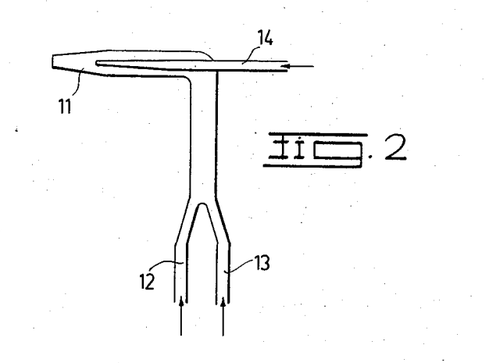
Fig. 2 is a cross-section through another type of gas supply pipe adapted to supply heating gas as well as chlorine to the furnace.

Fig. 2 represents another burner arrangement for supplying chlorine to the heating gases. Hydrogen and oxygen are supplied to burner nozzle 11 through pipes 12 and 13, respectively. Said heating gases are mixed in tube 31 before they enter burner nozzle 11. Nozzle 14 extends into burner nozzle 11, said nozzle 14 being supplied with chlorine at such a speed that the chlorine velocity of flow corresponds approximately to the velocity of flow of the flame or even exceeds said flame velocity, if possible.

It is, of course, also possible to carry out melting of the rock crystal grains and building up of a substantially pure quartz glass body by electric heating. For this purpose a quartz glass body is rotated within an electric furnace and the quartz grains to be built up thereon are strewn from above upon said quartz glass body. Chlorine is supplied to the surface to be processed through a nozzle extending from the top of said electric furnace downwardly toward the quartz glass body. Chlorine must be available in an amount sufficient to remove substantially all the impurities in the form of volatile compounds. Besides chlorine, one may additionally introduce, if required, hydrogen chloride or hydrogen in order to increase the reactivity of chlorine. In general, not more than about 30%, and preferably about 5–15%, of hydrogen chloride or hydrogen, calculated for chlorine, are supplied.

Figures 3, 6:
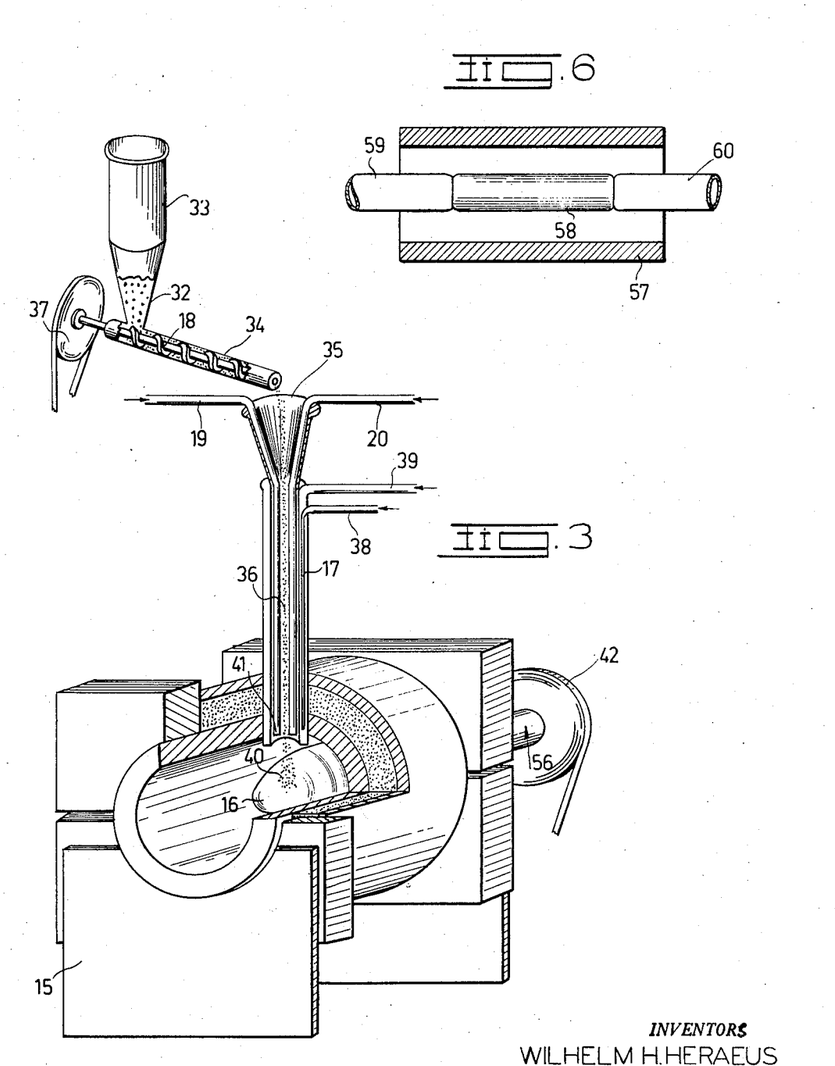
Fig. 3 is a perspective view through another type of furnace for making a substantially pure cylinder-like quartz glass body wherein the feeding device, the gas supply pipes, and part of the furnace are shown in cross-section.
Fig. 6 illustrates the process of homogenizing the quartz glass.

Fig. 3 illustrates a furnace for carrying out the process according to this invention by electrical heating.

Quartz glass body 16 is rotated around its longitudinal axis in electrically heated muffle furnace 15. Said quartz glass body 16 is built up on a silicic acid body 56 of low-quality silicic acid material such as quartz ware. Said silicic acid body 56 is rotated around its longitudinal axis by means of power drive 42. Grains of rock crystal 32 are filled into hopper 33 and are continuously and uniformly supplied through inclined quartz pipe 34 to funnel-like opening 35 of vertical feeder tube 36. Inclined quartz tube 34 is provided with conveyor screw 18 which is driven by power drive 37. Feeder tube 36 is provided with jacket 17, through which cooling water is passed by means of inlet pipe 38 and outlet pipe 39. Said feeder tube 36 causes the quartz glass grains 32 to be continuously and uniformly strewn upon surface 40 of quartz glass body 16. Chlorine gas is introduced through pipe 19 extending through feeder tube 36 and escapes from said pipe 19 through exit opening 41 arranged at a short distance from surface 40 of cylindrical quartz glass body 16. Said chlorine gas is introduced into supply pipe 19 under a pressure of about 0.5 atmosphere gauge and with a speed of 40–180 m. per second and preferably of 120–160 m. per second. To increase the reactivity of said chlorine gas with the impurities present in said rock crystal, there are introduced at the same time small amounts of hydrogen by means of pipe 20. In this case, it is also necessary to supply the chlorine at the above indicated speed, so that the rock crystal grains are completely surrounded and enveloped by said chlorine gas during melting and building up.

Chlorine treatment of quartz raw material in the molten state according to the present invention considerably improves the properties of the resulting quartz glass and of casings of gas discharge tubes and lamps made therefrom with respect to their permeability to ultra-violet rays and their service life.

When proceeding according to this invention, foreign elements cannot become embedded in the quartz glass at the place where it is molten and built up to a quartz glass body because said foreign elements form readily volatile compounds with chlorine and escape in the form of such compounds. Thus, for instance, sodium, magnesuim, calcium, barium, aluminum, copper, zinc, titanium and/or iron are removed in the form of their chlorides. Due thereto, quartz glass casings according to this invention exhibit a high resistance against recrystallization because substantially no crystallization nuclei or seeds are present in the quartz glass treated in this manner. This has the further advantage that aging of tubes and lamps made with such casings is very substantially retarded. Devitrification and discoloration are also considerably retarded and the service life of gas discharge tubes and lamps provided with such casings is considerably prolonged.

Furthermore, the process according to this invention has the advantage that, when working with the above indicated chlorine concentration, occlusion of free hydrogen or intercalation of hydroxyl groups into the structure or texture of the quartz glass is avoided and said quartz glass is composed to a much greater extent of silicon dioxide or silicon tetroxide tetrahedrons than this is the case in any other known process of melting rock crystals. The presence of such readily volatile gases as hydrogen in quartz glass as made heretofore has a reducing effect and causes formation of lower silicon oxides and especially silicon monoxides, which lower silicon oxides considerably impair the chemical properties and the transmissivity for rays of quartz glass containing such gases.

It is evident that the quality of quartz glass material of which casings for glass discharge tubes are made is not only dependent upon the impurities which can be determined as residue, for instance, on evaporating quartz glass by means of hydrogen fluoride, but also upon its content of volatile substances and especially of hydrogen and of compounds which contain the same elements as silicon dioxide itself, i.e., lower oxides of silicon, such as silicon monoxide.

By subjecting quartz raw material to an especially intense chlorine treatment according to this invention, quartz glass can be obtained which is free of any fluorescence. Fluorescence, as is known, is caused by the presence of centers of disturbances in the lattice structure of a substance. For instance, very small amounts of a foreign element present in a material are capable of causing fluorescence. Absence of fluorescence in quartz glass, therefore, can be considered as proof of highest purity.

Casings of gas discharge tubes composed of high purity quartz glass according to this invention exhibit, due to their high purity, a greater transmissivity to ultra-violet rays than casings made of commercial quartz glass. Said transmissivity can be displaced towards the short-wave part of the spectrum up to about 200–300 angstroms. An immediate result thereof is a higher yield of ultraviolet UVC.

The absence of hydrogen in casings of gas discharge tubes and lamps according to the present invention produces further advantages. Evacuation and heating time on manufacturing tubes and lamps with quartz glass according to this invention is considerably reduced. Furthermore, in the operation of gas discharge tubes and lamps made with unheated quartz glass, occluded hydrogen emanates from the casing walls and causes ionization of the gas discharge path. These disturbances are completely eliminated when using as casing material quartz glass according to the present invention which is substantially free of hydrogen.

While it is advisable, when carrying out the present invention, to prevent any occlusion of hydrogen and/or embedding of lower silicon oxides, especially of silicon monoxide, in contrast thereto, inclusion of silicon chlorides into the silicon dioxide structure does not cause disadvantages. On the contrary, such inclusion is often of some advantage. Especially suitable are high molecular silicon chloride compounds which are stable even at temperatures up to 800–900° C. Apparently such high molecular silicon chlorides, incorporated into the structure of qartz glass, decrease its reactivity. Such decrease in reactivity causes considerable retardation of the onset of devitrification at higher temperatures. Consequently, the decrease in ultra-violet intensity, for instance, in a mercury high-pressure lamp, sets in only after such lamps or tubes have been used for a considerably longer period of time than lamps or tubes the casings of which are made of untreated quartz glass as used heretofore.

The use of substantially pure quartz glass according to this invention considerably improves the service life of ultra-violet tubes and lamps of various kinds, and especially of tubes and lamps for technical and illuminating purposes. For such purposes there have mostly been used high pressure and highest pressure mercury discharge tubes and especially lamps provided with an additional gas filling to cause ignition. Usually noble gases are used as such filling. Such lamps have the form of a tube of small cross-section or spherical or capillary form. Such luminous-discharge lamps or tubes made of quartz glass are exposed at their inner walls to especially high thermal stress due to their high energy density. The voltage drop per cm., for instance, is of the magnitude of several hundred volts, at a current intensity of the magnitude of several or only a few amperes. Thereby, a surface luminous intensity of the tied up gas discharge is produced which is of the magnitude of tens of thousands of international candles per sq. cm. The temperature in such tubes rises to 700° C. to 1200° C. (1292° F. to 2192° F.) With mercury-discharge tubes, as they were used heretofore in the manufacture of technical and therapeutic ultra-violet lamps, aging due to "etching or corrosion" and discoloration of the quartz glass casing occurs during prolonged use of such lamps. Illuminating lamps as heretofore employed, however, exhibit devitrification and discoloration already after a few hours of use. Such rapid onset of devitrification and discoloration is the reason why heretofore the use of such illuminating lamps was considered impractical.

The difference in the service life of gas-discharge tubes as heretofore employed and gas-discharge tubes with quartz glass casings made according to the present invention is so remarkable that technical and therapeutic ultra-violet lamps provided with burners according to this invention, and even more so illuminating lamps provided with the new gas discharge tubes, open entirely new technical possibilities. It is possible, without any special effort to prolong the time when devitrification, seriously affecting the output in light energy, sets in at least by 40%. Furthermore, progressive devitrification, after it has set in, is slowed down to such an extent that at the end of the normal service life of a high-pressure lamp the entire ultra-violet emission decreases only to the extent of 5% to 10% while lamps as heretofore used lose about 40% to 50% of said ultra-violet emissivity.

The new burners of gas discharge tubes according to the present invention have the additional advantage that they turn out more uniformly during manufacture than heretofore possible. Consequently, waste on large scale manufacture is reduced. Likewise, the working conditions during heating and evacuating the tubes are simplified.

Casings for gas discharge tubes obtained by the above described chlorine treatment, during building up the quartz glass blank and/or during shaping, molding, drawing, or otherwise forming said casings, which casings consist of substantially pure quartz glass, have the further advantage that less shrinkage is observed on making such casings. This is a very important feature of the present invention because it eliminates, to a great extent, waste and rejects and, thus, allows more economic production of said casings.

As stated above, lamps made according to this invention when initially used lose about 5 to 10% of their light emission efficiency very slowly and reach the maximum loss of efficiency of 5 to 10% in about 1500 hours of use. The lamps after such loss of 5 to 10% become stabilized and constant in their efficiency and will thereafter operate at approximately such high rate for the remainder of the life of the lamp.

Gas discharge tubes having quartz casings and envelopes are employed for the generation of ultra-violet rays and of visible light. To utilize such tubes for generating ultra-violet rays has attained great importance for therapeutic as well as for technical purposes. Mercury discharge tubes have proved to be especially suitable. Other metal-vapor discharge tubes, for instance, of cadmium, are of minor importance. In order to attain highest light-emission, it has been suggested to fill the discharge tube with highly volatile compounds, for instance, with chlorides of metals which are only difficultly volatile. Said chlorides dissociate in the discharge tube so that the characteristic spectrum of the metals is emitted.

In the case of mercury discharge lamps a distinction is made between low pressure discharge lamps and high pressure discharge lamps, the border line between both types being at a pressure of about 10 to 100 torrs. Discharge lamps at pressures of more than about 30 atmospheres are designated as highest pressure discharge lamps. The present invention relates more particularly to the improvement of gas discharge tubes for high pressure discharge and, at the same time, for highest pressure discharge.

The discharge chambers, the so-called "burners," in high pressure lamps and highest pressure lamps ordinarily consist of quartz glass. In most cases the casing of the burner is a tubular body, usually of elongated shape or bent in U-form. Of course, devices of this type of spherical shape or provided with spherical extensions are also known. Capillary tubes are also used especially when high energy concentration of the gas discharge is required. The casings or envelopes of such burners are made of quartz glass tubes, which were drawn, for instance, from a blank that was fused by a gas or electric process.

Figure 4:
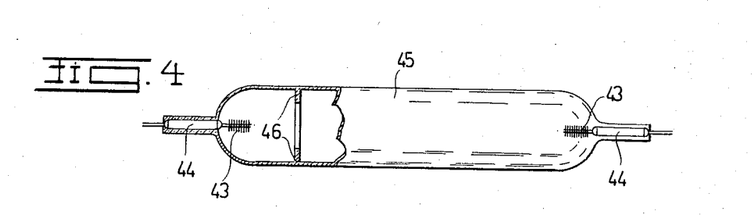
Fig. 4 shows a lamp for producing ultra-violet rays which serves for the generation of ultra-violet rays, said lamp having a casing made of substantially pure quartz glass according to the present invention.

An example of a burner useful for the production of ultra-violet rays, especially in therapeutic lamps, which, however, may be used for many other technical purposes, is illustrated in Fig. 4. It represents a mercury high pressure lamp, the quantity of mercury present therein being regulated in such a way that it completely vaporizes during operation. Electrodes 43, supplied with electric current by means of current inlets 44, are arranged in quartz glass casing 45 according to this invention. Screen 46 prevents impurities from passing from the electrodes into the gas chamber. Casing 45 consists of quartz glass which has been molten and drawn according to the above described process of this invention in the presence of chlorine gas, and, thus, is substantially pure. As already mentioned, the improvement achieved by this invention is of considerable importance for ultra-violet radiators not only for therapeutic use but also for various technical purposes, for instance, in connection with various physical apparatus, laboratory devices, and as source for ultra-violet rays for chemical reactions. The improvement according to this invention is especially useful in connection with high pressure lamps in devices for making blueprints because such devices require as uniform emission as possible over the entire length of the burner.

Figure 5:
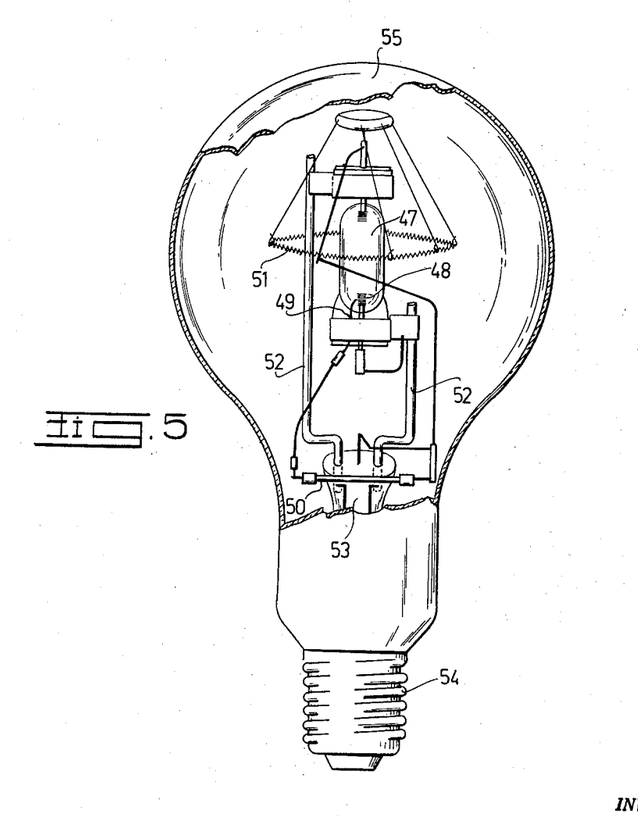
Fig. 5 illustrates a mercury vapor mixed light lamp, i.e., a lamp for lighting or illuminating purposes in which, besides the gas discharge radiator, a coiled filament is arranged, said lamp also being provided with a casing made of substantially pure quartz glass.

In Fig. 5 a lamp for illuminating purposes is illustrated which contains a gas discharge lamp according to the present invention. Said lamp is a mercury vapor-mixed light lamp, i.e., a lamp combining a mercury vapor discharge tube with a coiled up filament lamp, both serving at the same time as a source of light. Burner casing 47 is made of quartz glass. Two electrodes 48 and auxiliary electrode 49 provided to insure perfect ignition, and ignition resistance 50 are arranged in said lamp. Coiled up filament 51 fulfills a double task. It serves as a further source of light and, at the same time, as a series resistance for the gas discharge tube. Parts supplying the electric current are conductor 52, which also serves as a support, pinch foot 53 for vacuum tight introduction of the electric wire, and screw cap 54 for screwing in the bulb. All the parts mentioned are sealed in glass bulb 55. In electric lamps for illuminating purposes frequently the gas discharge tube is not surrounded by a coiled up filament and the series resistance is arranged outside of the lamp body. In this case, for instance, the series resistance may be a simple ohmic resistance, or an inductive resistor, or a filament lamp. All these illuminating lamps according to the present invention have a guaranteed considerably increased service life.

The above described devices are, of course, merely examples of embodiments of this invention and serve to demonstrate the advance in the art achieved thereby. The invention, of course, is by no means limited thereto and may find various other applications.

The treatment with halogen and especially with chlorine according to the present invention is not only carried out during the manufacture of the quartz glass itself, i.e., during the production and building up of the quartz body or mass. It can also be effected during shaping and molding of said quartz body or mass to the desired article, and especially during drawing or otherwise forming tubes for lamp casings. Often, it is of advantage to use the chlorine treatment during building up of the quartz body or mass as well as during molding, drawing, or otherwise shaping and forming such casing tubes.

Of course, when treating the finished quartz glass tube with chlorine during shaping and forming, primarily only a superficial treatment of the quartz walls of such tubes is achieved while the depth effect is somewhat limited. However, when producing casings for gas discharge tubes, said limited superficial chlorine action gives fully satisfactory results because, in general, only the surface of such casings is subjected to considerable stress during operation of said gas discharge tubes; for, said tubes are exposed to thermal and chemical stress and strain mostly at their inner surface. Hence, it is ordinarily sufficient to expose the quartz material to the action of chlorine or a volatile agent capable of splitting off chlorine during the tube drawing step. Thereby hydrogen chloride, hydrogen, or steam may be added in limited amounts as described above. The tubes are drawn in a manner known per se. Chlorine treatment can be effected in a similar manner as described above for the process of melting quartz and building up the quartz glass body or mass. The purifying effect of a chlorine treatment during drawing and the like processing is especially high at the place where the highest temperatures exist, i.e., within the drawing furnace or the drawing blast apparatus where the temperature is above 1600° C. and preferably between 1800° C. and 2200° C.

Although carrying out the process according to this invention by means of chlorine is very simple and most economical, it is, of course, also possible to modify said process by using other halogens, such as fluorine, bromine, iodine, whereby, however, the procedure must be adapted to the different properties and behavior of said other halogens, said different properties and behavior being familiar to an expert in the art. Especially fluorine shows principally the same effect as chlorine and the same procedure must be observed as described above for chlorine. Fluorine, however, is rather difficult to handle and requires apparatus of a material, such as platinum and platinum alloys, which is not attacked by fluorine. Furthermore, any undue heating must be avoided by providing additional cooling.

Instead of building up a substantially pure quartz glass suitable for producing casings for gas discharge tubes by means of silicon dioxide, it is also possible to use other silicon compounds which decompose at high temperature to form silicon dioxide, and particularly silicon compounds which are hydrolytically decomposed to silicon dioxide. Silanes which react with steam or oxygen to form silicon dioxide are, for instance, suitable for certain purposes. The conditions regarding the treatment with chlorine or chlorine compounds correspond to those described above for directly building up quartz glass from silicon dioxide. Use of organo-silicon compounds as starting materials is quite satisfactory for many purposes.

It is also possible to supply chlorine not in the form of elementary chlorine during production of casings for gas discharge tubes but in the form of compounds which decompose in the gaseous state to chlorine at the high temperatures involved or which yield chlorine by reaction with other gases. For instance, compounds such as hydrogen chloride, which are decomposed to a certain extent to chlorine at said high temperatures, can be used, at least partly, as described above. According to the present invention, quartz glass suitable for making casings for gas discharge tubes, distinguished over prior casings by their excellent resistance to aging, can also be made by using such starting materials.

It is advisable to use very pure silicon dioxide as starting material for carrying out the invention in the manner described above and, furthermore, to take care that during the various steps of processing impurities are prevented from getting into the quartz glass. Proceeding in this manner will insure that casings for gas discharge tubes of the highest purity exhibiting all the above mentioned advantages are obtained. The process according to the present invention, however, has the further advantage that it is also possible to use somewhat less pure starting materials, such as rock crystals having included therein, for instance, certain metal oxides and/or silicates. Such impurities are also substantially completely removed by subjecting said impure starting material to the process of this invention.

Quartz glass casings for gas discharge tubes made according to the process of treating the starting material with chlorine, as described above more in detail, represent an approximate standard for determining which amount of impurities is permissible in such casings in order to guarantee an extraordinarily high service life of said casings and consequently of such gas discharge tubes.

Substantially higher amounts of impurities than those obtained by said chlorine treatment are not permissible, although a small increase in such impurities will not considerably shorten the effective service life of such tubes. Regardless, in what manner the quartz glass casings were produced and from what kind of quartz glass material they were made, it is readily possible to determine whether the quartz glass is sufficiently pure by comparing said casings with casings made from quartz glass treated with chlorine. When using for such other processes a starting material of the highest possible purity and observing the above mentioned precautionary measures, it is possible to produce quartz glass casings of extraordinarily high effective service life, comparable in their effectiveness with quartz glass casings made from chlorine treated quartz glass.

To increase the service life of casings for gas discharge tubes made from quartz glass which does not fully correspond to the above mentioned requirements with regard to purity, i.e., the purity of which does not fully correspond to that of chlorine treated quartz glass, said casings may be subjected to a homogenizing treatment. Said treatment which forms a further object of the present invention consists in homogenizing quartz glass in such a manner that foreign elements included in such quartz glass are distributed as finely and uniformly as possible throughout the quartz glass mass. It is possible, in this manner, for instance, to render quartz glass produced by other methods than by chlorine treatment approximately equivalent in its quality and prolonged service life, when used as casing for gas discharge tubes, to quartz glass subjected to chlorine treatment. It is also possible to still further improve the stability of quartz glass subjected to the chlorine treatment, described above more in detail, by homogenizing and uniformly and evenly distributing therethrough any traces of impurities which might be present in such chlorine treated quartz glass.

Homogenizing is effected, for instance, by mechanically stirring the molten quartz mass. For this purpose the molten mass 38 to be homogenized is thoroughly worked, as shown in Fig. 6 of the attached drawings, in chamber 57 heated to melting temperature, by means of stirring rods 59 and 60 which are moved relatively toward and away from each other. Progress of homogenization may be observed, for instance, by optical processes. An especially advantageous process of homogenizing quartz glass is the dispersing process whereby quartz glass is exposed to the action of supersonic waves.

The stirring process is preferably carried out in such a manner that any direct contact of the material with the walls of the furnace, etc., is avoided. For instance, a body of quartz glass 58 is held at both ends by suitable supports 59 and 60 and is rotated. Said supports 59 and 60 are moved relatively toward and away from each other but in a manner that any contact of the softened mass with the walls, for instance, of heating chamber 57 is avoided. The body of quartz glass 58, freely suspended and attached to rods 59 and 60, is introduced into cylindrical furnace 57 heated by an oxygen-hydrogen blow pipe or electrically by resistance elements. The temperature of said furnace is so high that softening of the quartz mass takes place. Said softened mass is then alternately compressed and stretched by moving said rods relatively toward and away from each other. A preferred mode of carrying out this stirring process consists in twisting the rods against each other. Since a furnace as used for such treatment usually has only a comparatively narrow zone of highest temperature, the quartz glass body is advanced therein step by step so as to treat its entire length. In this manner a mass of completely homogenized quartz glass is obtained.

It is also possible to homogenize pieces of quartz glass, at least to a limited depth, by subjecting the same to a treatment with supersonic waves. For this purpose the work piece 58 to be treated, as shown in Fig. 6 of the attached drawings, is attached by fusing to a quartz ware support 53 at one end and to a piece of quartz glass 60 which is connected to a magnetostriction oscillator (not shown) at the other end.

The short quartz glass cylinder 58 to be subjected to the action of supersonic waves is placed into electric resistance furnace or high frequency furnace 57 which is heated to a temperature of at least 1600° C. and preferably to a temperature between 1800° C. and 2200° C. A magneto-striction oscillator (not shown) as well as an iron rod (not shown) serving as coupling element are cooled. The end of said iron rod has a cup-like shape. A piece of quartz glass 60 is fit, by grinding, into said cup-like end and is clamped therein in such a manner that a satisfactory seal and contact are assured.

The quartz glass cylinder 58 held at its other end by quartz ware support 59 is then exposed at the above indicated temperature to the action of supersonic waves with a frequency of 10,000 Hertz units to 30,000 Hertz units, and preferably with a frequency of 15,000 Hertz units and 20,000 Hertz units. Since the depth of penetration to which the supersonic waves penetrate the quartz glass cylinder is limited, the homogenizing effects achieved thereby extend only to a certain depth of the heated quartz glass cylinder. Thereby the particles of the quartz glass material perform oscillating movements. Due to the pressure of the sound rays, limited local displacements or dislocations occur within the material subjected to said supersonic pressure.

As has been mentioned above, said homogenizing treatment causes uniform distribution of the impurities in a quartz glass mass. Impurities present in non-homogenized quartz glass readily serve as seed-like formations or nuclei which are responsible for more or less pronounced recrystallization and, consequently, for devitrification and, furthermore, for certain reduction phenomena causing discoloration. When heating pieces of such non-homogenized quartz glass, for instance, to 1000° C., small areas or spots become visible after about 10 hours' exposure to such a temperature, whereas, before such heating, such spots could not be detected by the naked eye or, if they could be detected at all, then only by a sensitive striae method. Said spots increase in size on continued heating. After heating for several weeks they form large recrystallization centers having a diameter up to many millimeters. Of course, speed and extent of devitrification is dependent also on other factors.

More exactly speaking, two different groups of inclusions of foreign elements must be distinguished, namely such which are not at all or only slightly affinitive to silicic acid. Such impurities having a particle size above $100\mu$ and up to $1000\mu$, such as particles of carbides or particles of difficultly soluble elements, are reduced in size to a particle size below $100\mu$ and preferably below $10\mu$ by the above described homogenizing treatment. As a result thereof the tendency of said particles to act as seeds or nuclei causing harmful reactions is considerably reduced.

The other type of impurities are those which are capable of forming compounds with quartz glass and of interlinking therewith to a glass containing larger or smaller amounts of silicic acid. Such impurities are certain metal oxides, especially oxides of alkaline earth metals. Thereby frequently mixed glasses with a particle size up to 3 mm. and even more are formed. Said mixed glasses are not directly visible to the naked eye but can be detected only by interference, striae, or polarization methods. Such embedded particles of mixed glass, of course, rapidly crystallize on heat treatment and form thereby devitrification centers. The reactivity of homogenized quartz glass is the lower the more such inclusions are interlinked and the more thoroughly the interlinked glass complex is distributed within the silicic acid lattice. Uniform distribution of the various reduction products, such as silicon monoxide and other stages of reduction, is also of importance for the production of quartz glass of superior quality and is also achieved by homogenization as described above.

It shall, of course, be left open to question whether besides the above indicated effects, other effects are additionally produced by a homogenizing treatment according to this invention and whether said other effects are also responsible for the improvements achieved with respect to aging, and especially to devitrification and reduction phenomena causing discoloration.

Substantially pure quartz glass, obtained according to the above described chlorine treatment process, can be advantageously used not only for making casings for gas discharge tubes or lamps but also for other apparatus and parts of apparatus requiring quartz glass of a quality satisfactory to optical requirements. Such parts of apparatus comprise, for instance, transparent media which bundle rays in order to concentrate or beam them or to disperse them or which serve for rectilinear propagation of parallel directed radiation. Such transparent media comprise, for instance, prisms which deflect a rectilinear path of rays in such a manner that the light is spectroscopically dispersed or separated, or lenses which collect light concentrically around an optical axis or which disperse light whereby refracting influences may compensate each other. Besides prisms and lenses, such parts of optical apparatus and devices comprise also plane plates which are used, for instance, for making filters and filter cuvettes or for sealing chambers from which a path of optical rays is to be conducted into an area subjected to other conditions of pressure.

Various types of glass and crystals were used heretofore for such transparent media. Thereby it is of great importance that optical disturbances, such as striae, occlusions or inclusions which change the refractory power of said materials or which absorb optical rays, are substantially avoided.

A quartz glass which has been treated with chlorine, as described herein, considerably improves the optical properties of such parts of apparatus and simplifies their manufacture. Chlorine treatment produces a quartz glass of considerably increased transparency to ultraviolet rays, making it especially suitable for parts of optical apparatus.

Chlorine or the like treatment may be carried out during the production of quartz glass from silicon dioxide, especially from comminuted rock crystal. It may, however, also be carried out during shaping, molding, or otherwise working and processing quartz glass and especially during shaping, and like working operations at elevated temperature.

The procedure in the last mentioned case is analogous to that described above for the production of substantially pure quartz glass used in the manufacture of casings for gas discharge tubes and lamps.

In the practice of this invention, in place of chlorine, fluorine, compounds such as hydrogen chloride, which split off chlorine either by thermal decomposition or by reaction with admixed accompanying substances can be used, said compound yielding, besides chlorine, only volatile substances. This invention produces quartz glass of considerably higher purity than quartz glass as heretofore used for parts of optical and the like apparatus and devices. Said higher purity is also responsible for the higher transparency to ultra-violet light of parts of optical apparatus made therewith.

The transparency of quartz glass reaches into the zone of 1600 angstrom. In the range between about 2200 angstrom and 1600 angstrom, transparency decreases quite abruptly. For instance, the transparency of a normal quartz glass plate of 10 mm. thickness at 2000 angstrom is about 35% and at 1600 angstrom about 10%. When using glass plates of the same thickness made from quartz glass, treated for instance with chlorine according to the present invention, the transparency to ultra-violet rays at 2000 angstrom is about 85%, at 1800 angstrom still about 80%, and at 1700 angstrom about 30% to 50%, i.e., at least about three times as high as that of ordinary quartz glass heretofore used in optical apparatus and parts of optical apparatus and the like. Due to the higher purity of quartz glass treated with chlorine according to the present invention, such optical apparatus and parts of optical apparatus and the like are usually substantially free of striae and of inhomogeneities.

As stated above, chlorine treatment according to this invention may not only be carried out during the production of the quartz glass itself, i.e., during building up a quartz glass body or mass from rock crystal or the like, but also during subsequent working and processing said quartz body or mass to desired parts of optical apparatus. Working up, further processing, shaping, molding, or otherwise forming articles, parts or products from the quartz treated according to this invention is carried out by the standard methods. In such standard methods, for instance, the known operations of press-molding, upsetting, and stretching of quartz glass can readily be performed in the presence of chlorine. The chlorine treatment can also be combined with the homogenization of the molten quartz glass as heretofore described, i.e., whereby striae and optical inhomogeneities which are present in said quartz glass, are eliminated. Chlorine treatment during homogenization has the advantage that an extraordinarily intimate contact even of the smallest quartz particles with chlorine is insured.

We claim:

1. In an ultraviolet light lamp having a fused quartz glass casing with electrodes sealed therein, the improvement which comprises said fused glass casing being constituted of substantially pure quartz glass free of conductive elements, carbon, metalloids, compounds containing such elements, hydrogen, and oxides of silicon with a lower oxygen content than silicon dioxide in amounts capable of forming centers of recrystallization, said quartz glass being characterized by a considerably prolonged onset of devitrification when exposed, during use, to high temperature, and having a high devitrification temperature.

2. Improvement according to claim 1 in which said casing is constituted of quartz glass containing small amounts of high molecular, temperature resistant silicon chlorides.

3. Improvement according to claim 1 in which said casing is constituted of quartz glass, the purity of which corresponds to the purity of quartz glass subjected at a temperature of above 1600° C. to the action of chlorine.

4. Improvement according to claim 1 in which said casing is constituted of substantially pure quartz glass, substantially free of fluorescence imparting impurities.

5. In an ultraviolet light lamp having a fused quartz glass casing with electrodes sealed therein, the quartz glass of the casing containing amounts of impurities selected from the group consisting of conductive elements, carbon, metalloids, compounds containing such elements, hydrogen, and oxides of silicon with a lower oxygen content than silicon dioxide, normally capable of forming centers of recrystallization, the improvement which comprises said impurities having a particle size below about $100\mu$ and being homogenized and uniformly dispersed throughout said quartz glass.

6. Improvement according to claim 5 in which the particle size of said impurities is below about $10\mu$.

References Cited in the file of this patent

UNITED STATES PATENTS

| | | |
|---|---|---|
| 805,303 | Kuch | Nov. 21, 1905 |
| 1,003,271 | Kent | Sept. 12, 1911 |
| 1,330,611 | Quimby et al. | Feb. 10, 1920 |
| 1,549,597 | Miller | Aug. 11, 1925 |
| 1,612,628 | George | Dec. 28, 1926 |
| 2,038,627 | Badger | Apr. 28, 1936 |
| 2,089,546 | Dudding et al. | Aug. 10, 1937 |
| 2,236,708 | Grimditch | Apr. 1, 1941 |
| 2,387,222 | Wright | Oct. 16, 1945 |
| 2,654,043 | Freeman et al. | Sept. 29, 1953 |
| 2,697,183 | Neunhoeffer | Dec. 14, 1954 |
| 2,721,285 | Beese | Oct. 18, 1955 |
| 2,781,470 | Bellott | Feb. 12, 1957 |

FOREIGN PATENTS

| | | |
|---|---|---|
| 567,863 | Germany | Jan. 11, 1933 |